(12) United States Patent
Song et al.

(10) Patent No.: US 11,526,259 B2
(45) Date of Patent: Dec. 13, 2022

(54) METHOD AND APPARATUS FOR DETERMINING EXTENDED READING CONTENT, DEVICE AND STORAGE MEDIUM

(71) Applicant: Baidu Online Network Technology (Beijing) Co., Ltd., Beijing (CN)

(72) Inventors: Dandan Song, Beijing (CN); Houqing Yao, Beijing (CN); Peng Shi, Beijing (CN); Lin Bo, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 220 days.

(21) Appl. No.: 17/023,048

(22) Filed: Sep. 16, 2020

(65) Prior Publication Data
US 2021/0223921 A1  Jul. 22, 2021

(30) Foreign Application Priority Data

Jan. 17, 2020 (CN) .......................... 202010054605.4

(51) Int. Cl.
*G06F 3/0483* (2013.01)
*G06F 16/93* (2019.01)
*G06F 40/295* (2020.01)
*G06F 7/08* (2006.01)

(52) U.S. Cl.
CPC .............. *G06F 3/0483* (2013.01); *G06F 7/08* (2013.01); *G06F 16/93* (2019.01); *G06F 40/295* (2020.01)

(58) Field of Classification Search
None
See application file for complete search history.

(56) References Cited

U.S. PATENT DOCUMENTS

| 8,365,059 B2 | 1/2013 | Walsh et al. | |
| 2003/0217061 A1* | 11/2003 | Agassi | G06F 16/9535 |
| 2015/0269612 A1* | 9/2015 | Cucerzan | G06F 40/295 |
| | | | 705/14.49 |

(Continued)

FOREIGN PATENT DOCUMENTS

| CN | 108153901 A | 6/2018 |
| CN | 109325201 A | 2/2019 |
| CN | 109902245 A | 6/2019 |

OTHER PUBLICATIONS

Aljaber, Bader, Nicola Stokes, James Bailey, and Jian Pei. "Document clustering of scientific texts using citation contexts." Information Retrieval 13, No. 2 (2010): 101-131. (Year: 2010).*

*Primary Examiner* — Frank D Mills
(74) *Attorney, Agent, or Firm* — Seed IP Law Group LLP

(57) ABSTRACT

The present disclosure provides a method and apparatus for determining an extended reading content, a device, and a storage medium, relating to the field of data processing. The method may include: displaying a target page, in response to a viewing request to the target page; giving a reading prompt to an extended reading resource in the target page, based on a corresponding relationship between a requirement recognition result of at least one target reading content in the target page and the extended reading resource; and displaying the extended reading resource, in response to the viewing request matching the reading prompt.

17 Claims, 5 Drawing Sheets

(56) References Cited

U.S. PATENT DOCUMENTS

| | | | | |
|---|---|---|---|---|
| 2015/0339310 A1* | 11/2015 | Pursche | ................... | G06F 16/93 |
| | | | | 707/726 |
| 2015/0339616 A1* | 11/2015 | Pursche | ......... | G06Q 10/063112 |
| | | | | 705/7.14 |
| 2019/0155949 A1* | 5/2019 | Castaneda | ............. | G06F 16/951 |
| 2020/0409990 A1* | 12/2020 | Saito | ................... | G06F 16/5846 |
| 2021/0089765 A1* | 3/2021 | Ling | .................... | G06K 9/6257 |
| 2021/0208741 A1* | 7/2021 | Yang | ..................... | G06F 16/951 |

\* cited by examiner

METHOD AND APPARATUS FOR DETERMINING EXTENDED READING CONTENT, DEVICE AND STORAGE MEDIUM

CROSS-REFERENCE TO RELATED APPLICATIONS

This application claims priority to Chinese Patent Application No. 202010054605.4, filed on Jan. 17, 2020, titled "Method and apparatus for determining extended reading content, device and storage medium," which is hereby incorporated by reference in its entirety.

TECHNICAL FIELD

The present disclosure relates to the field of data processing, and specifically to a method and apparatus for determining an extended reading content, a device and a storage medium.

BACKGROUND

At present, electronic reading scenarios are ubiquitous. Whether it is news websites, E-books, We-medias or Q&A websites, etc., they are constantly reducing the cost of human acquiring knowledge. However, a user may inevitably have new cognitive requirements during electronic reading.

In the process of implementing the present disclosure, the inventor finds that when the user is reading a certain page, new reading requirements may be generated in real time. For example, in the process of reading a certain picture, the user wants to know biographical information of a certain character in the picture, or when reading a certain line, the user wants to watch the movie from which the line comes, etc. In this regard, the user needs to interrupt the current reading content, and independently constructs a new search term for online search to meet the new reading requirements, and then returns to the current page to continue reading after the new reading requirements are met. This reading method breaks the continuity of reading, in addition, the user's self-initiated search method also reduces the reading efficiency of the user.

SUMMARY

Embodiments of the present disclosure provide a method and apparatus for determining an extended reading content, a device and a storage medium, which enrich the vividness of reading, expand the depth and breadth of reading, and improve a user's reading experience.

In a first aspect, an embodiment of the present disclosure provides a method for determining an extended reading content, including: displaying a target page, in response to a viewing request to the target page; giving a reading prompt to an extended reading resource in the target page, based on a corresponding relationship between a requirement recognition result of at least one target reading content in the target page and the extended reading resource; and displaying the extended reading resource, in response to the viewing request matching the reading prompt.

Alternatively, before giving the reading prompt to the extended reading resource in the target page, the method further includes: acquiring a requirement recognition result matching at least one target reading content in the target page; and acquiring an extended reading resource corresponding to the requirement recognition result, based on resource description information of resources in a resource library.

Alternatively, the acquiring the requirement recognition result matching at least one target reading content in the target page, includes: acquiring at least one target text content as the target reading content in the target page; and performing requirement recognition of at least one text granularity on the target reading content, to obtain a requirement recognition result matching the text granularity. The advantage of this setting is: considering that the most common reading content of the user is reading content in the form of text, by recognizing one or more text granularities in a text reading content, the extended reading requirements of the user with different text granularities may be met.

Alternatively, the performing requirement recognition of at least one text granularity on the target reading content, to obtain the requirement recognition result matching the text granularity, includes: acquiring requirement recognition models corresponding to text granularities, respectively; and inputting the target reading content into a matching requirement recognition model according to a recognition unit matching the requirement recognition model, to obtain the requirement recognition result matching a corresponding text granularity. The advantage of this setting is: by using a relatively technically mature requirement recognition model to determine the requirement recognition result matching the text granularity, it may meet real-time requirements while ensuring a recognition accuracy.

Alternatively, the text granularity includes: an entity; and after obtaining the requirement recognition result matching the entity, the method further includes: inputting the requirement recognition result of the entity into an entity extension requirement concept library, to obtain an entity upper requirement extension result and add the entity upper requirement extension result into the requirement recognition result of the entity; and/or inputting the requirement recognition result of the entity into an entity hotspot requirement concept library, to obtain an entity hotspot requirement extension result and add the entity hotspot requirement extension result into the requirement recognition result of the entity. The advantage of this setting is: by introducing the entity expansion requirement concept library and the entity hotspot requirement concept library, multi-dimensional entity extension requirements of the user during text reading are met, and the depth and breadth of reading are expanded.

Alternatively, the text granularity includes: a phrase; and after obtaining the requirement recognition result matching the phrase, the method further includes: inputting the requirement recognition result of the phrase into a phrase extension requirement concept library, to obtain a phrase requirement extension result and add the phrase requirement extension result into the requirement recognition result of the phrase. The advantage of this setting is: by introducing the phrase extension requirement concept library, multi-dimensional phrase extension requirements of the user during text reading are met, and the depth and breadth of reading are extended.

Alternatively, the acquiring the extended reading resource corresponding to the requirement recognition result, based on resource description information of resources in the resource library, includes: matching the resource description information of the resources in the resource library with the requirement recognition results of text granularities, to obtain resource recall results corresponding to the requirement recognition results of the text granularities; and screening the resource recall results to obtain the extended reading resource, according to an inclusion relationship between the text granularities corresponding to requirement recognition results. The advantage of this setting is: the resource recall results that best match potential extension requirements of the user during reading are acquired, which enriches the vividness of reading, and improves the user's reading experience.

Alternatively, the text granularity includes: an entity; matching the resource description information of the resources in the resource library with a requirement recognition result of the entity, to obtain a resource recall result corresponding to the requirement recognition result of the entity, includes: matching the requirement recognition result of the entity with resource tags of the resources in the resource library to obtain the resource recall result corresponding to the requirement recognition result of the entity. The advantage of this setting is: the resource recall result that best matches the potential entity expansion requirement of the user during reading is acquired, which enriches the vividness of reading, and improves the user's reading experience.

Alternatively, before matching the resource description information of the resources in the resource library with the requirement recognition result of the entity, the method further includes: filtering a general requirement entity included in the requirement recognition result of the entity. The advantage of this setting is: the general entity in the requirement recognition result of the entity is filtered, so as not to cause interference to the user when recommending a large number of extended reading content that matches the requirement recognition result of the entity.

Alternatively, the text granularity includes: a phrase; matching the resource description information of the resources in the resource library with a requirement recognition result of the phrase, to obtain a resource recall result corresponding to the requirement recognition result of the phrase, includes: matching a resource tag of an associated resource set in the resource library with the requirement recognition result of the phrase to obtain a first resource recall result; matching resource tags of the resources in the resource library with the requirement recognition result of the phrase to obtain the resource recall result corresponding to the requirement recognition result of the phrase, in response to the first resource recall result being empty; and generating the resource recall result corresponding to the requirement recognition result of the phrase, based on the first resource recall result, in response to the first resource recall result being not empty. The advantage of this setting is: the resource recall result that best matches the potential phrase extension requirement of the user during reading is acquired, which enriches the vividness of reading and improves the user's reading experience.

Alternatively, the text granularity includes: a sentence; matching the resource description information of the resources in the resource library with a requirement recognition result of the sentence, to obtain a resource recall result corresponding to the requirement recognition result of the sentence, includes: matching resource focuses of the resources in the resource library with the requirement recognition result of the sentence to obtain a second resource recall result; performing key entity recognition in the requirement recognition result of the sentence, and matching resource tags of the resources in the resource library with a key entity recognition result to obtain the resource recall result corresponding to the requirement recognition result of the sentence, in response to the second resource recall result being empty; and generating the resource recall result corresponding to the requirement recognition result of the sentence, based on the second resource recall result, in response to the second resource recall result being not empty. The advantage of this setting is: the resource recall result that best matches the potential sentence expansion requirement of the user during reading is acquired, which enriches the vividness of reading and improves the user's reading experience.

Alternatively, the text granularity includes: a paragraph; matching the resource description information of the resources in the resource library with a requirement recognition result of the paragraph, to obtain a resource recall result corresponding to the requirement recognition result of the paragraph, includes: matching resource content summary information and resource content detail information of the resources in the resource library with the requirement recognition result of the paragraph to obtain the resource recall result corresponding to the requirement recognition result of the paragraph. The advantage of this setting is: the resource recall result that best matches the potential paragraph expansion requirement of the user during reading is acquired, which enriches the vividness of reading and improves the user's reading experience.

Alternatively, the screening the resource recall results to obtain the extended reading resource, according to an inclusion relationship between the text granularities corresponding to requirement recognition results, includes: acquiring sequentially a target requirement recognition result of a target text granularity in ascending order of the text granularity; determining whether there is a requirement recognition result of another text granularity higher than the target text granularity in a target text content matching the target requirement recognition result; if yes, deleting a resource recall result corresponding to the target requirement recognition result; otherwise, using the resource recall result corresponding to the target requirement recognition result as an extended reading resource; and performing back the acquiring sequentially a target requirement recognition result of a target text granularity in ascending order of the text granularity, until processing of all requirement recognition results is completed. The advantage of this setting is: if a given target text content corresponds to requirement recognition results of a plurality of text granularities, only the requirement recognition result of the maximum text granularity may be kept to avoid interference to the user when recommending a large number of extended reading content.

Alternatively, after acquiring the extended reading resource corresponding to the requirement recognition result, based on resource description information of resources in the resource library, the method further includes: sorting and screening the extended reading resource according to a preset sorting and screening algorithm. The advantage of this setting is: the user is provided with the best-quality documents, pictures or videos as extended reading resources, which improves the user's reading experience.

Alternatively, after acquiring the extended reading resource corresponding to the requirement recognition result, based on resource description information of resources in the resource library, the method further includes: determining a reading content corresponding to each of the extended reading resource in the target page; and aggregating at least two extended reading resources to obtain a resource aggregation result corresponding to the target reading content, in response to that a given target reading content corresponds to at least two extended reading resources. The advantage of this setting is: the user is provided with the most comprehensive documents, pictures or videos as extended reading resources, which meets the user's extended reading requirements to the greatest extent.

Alternatively, after displaying the target page, in response to a viewing request to a target page, the method further includes: acquiring all page content in the target page, or using a page content selected by a user in the target page, as the target reading content.

Alternatively, before displaying the target page, in response to a viewing request to a target page, the method further includes: acquiring all page content in the target page as the target reading content, when the target page is acquired as a search engine indexed page.

Alternatively, the giving the reading prompt to the extended reading resource in the target page, includes: identifying a reading content corresponding to the extended reading resource in the target page, and displaying a resource icon at a page position matching the reading content to give the reading prompt to the extended reading resource. The advantage of this setting is: the reading content corresponding to the extended reading resource is identified in the target page, and the resource icon at the page position that matches the reading content is displayed, to facilitate the user to view the extended reading resource.

Alternatively, the displaying the extended reading resource, in response to the viewing request matching the reading prompt, includes: popping up a resource browsing floating layer matching the extended reading resource and/or a resource aggregation result in the target page, in response to a user operation matching the resource icon; and displaying the target extended reading resource, in response to a selection of a target extended reading resource in the resource browsing floating layer.

Alternatively, the resource comprises at lest one of: a video resource or an audio resource.

In a second aspect, an embodiment of the present disclosure provides an apparatus for determining an extended reading content, including: a target page displaying module, configured to display a target page, in response to a viewing request to the target page; an extended reading resource reading prompt module, configured to give a reading prompt to an extended reading resource in the target page, based on a corresponding relationship between a requirement recognition result of at least one target reading content in the target page and the extended reading resource; and an extended reading resource displaying module, configured to display the extended reading resource, in response to the viewing request matching the reading prompt.

In a third aspect, an embodiment of the present disclosure provides an electronic device, including: at least one processor; and a memory, communicatively connected to the at least one processor; where, the memory, storing instructions executable by the at least one processor, the instructions, when executed by the at least one processor, cause the at least one processor to perform the method for determining an extended reading content according to any embodiment of the present disclosure.

In a fourth aspect, an embodiment of the present disclosure provides a non-transitory computer readable storage medium, storing computer instructions, the computer instructions, being used to cause a computer to perform the method for determining an extended reading content according to any embodiment of the present disclosure.

An embodiment of the above disclosure, by the technical means of acquiring the extended reading resource corresponding to the requirement recognition result of at least one target reading content in the target page, and displaying the extended reading resource in the target page, may realize that while the user is reading the target page, extended reading resources corresponding to deep reading requirements in the page are acquired and provided to the user. While meeting the continuity of reading of the user, it meets the user's extended reading requirements to the greatest extent, enriches the vividness of reading, expands the depth and breadth of reading, and improves the user's reading experience. Other effects of the above alternative methods will be described below in conjunction with specific embodiments.

BRIEF DESCRIPTION OF THE DRAWINGS

Accompanying drawings are used to better understand the present solution and do not constitute a limitation to the present disclosure.

DETAILED DESCRIPTION OF EMBODIMENTS

The following describes example embodiments of the present disclosure in conjunction with the accompanying drawings, which includes various details of embodiments of the present disclosure to facilitate understanding, and they should be considered as merely exemplary. Therefore, those of ordinary skill in the art should recognize that various changes and modifications may be made to embodiments described herein without departing from the scope and spirit of the present disclosure. Also, for clarity and conciseness, descriptions of well-known functions and structures are omitted in the following description.

First Embodiment

Figure 1:
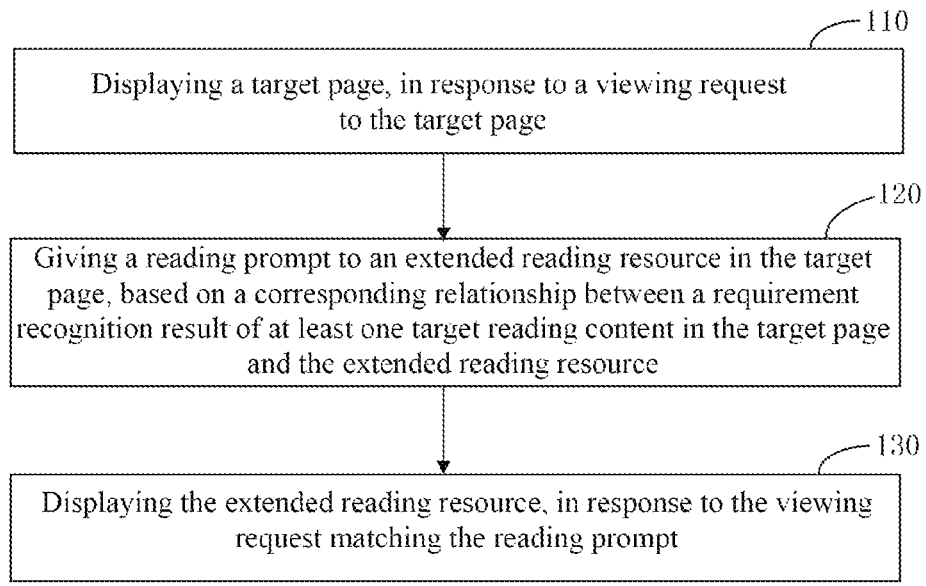
FIG. 1 is a schematic diagram according to a first embodiment of the present disclosure.

FIG. 1 is a flowchart of a method for determining an extended reading content provided in the first embodiment of the present disclosure. The present embodiment may be applied to a situation where one or more extended reading resources matching a reading content in a target page are displayed. The method may be executed by an apparatus for determining an extended reading content, which may be implemented by software and/or hardware, and may generally be integrated in a terminal or server having data recognition and processing functions. The method specifically includes the following steps.

Step 110, displaying a target page, in response to a viewing request to the target page.

In the present embodiment, the target page may be a page that is opened in real time during a user's web browsing using a terminal device, or may be a page that is indexed in real time by a search engine server during page indexing.

Step 120, giving a reading prompt to an extended reading resource in the target page, based on a corresponding relationship between a requirement recognition result of at least one target reading content in the target page and the extended reading resource.

In this step, the present embodiment may acquire all page content in the target page, or a page content selected by the user in the target page as the target reading content; and if the target page is a page indexed by the search engine server, the present embodiment may also acquire all the page content in the target page as the target reading content. Here, the target reading content may be effective reading content that has a certain amount of effective information in the target page and can meet the reading requirements of the user, for example, text, picture, audio, video, or the like. The target reading content may be all the effective reading content included in the target page, or content selected by the user in the target page during browsing the target page, for example, a certain paragraph of text, a certain picture, or a video, etc.

In the present embodiment, the requirement recognition result specifically reflects abstract content or key descriptive features reflected by the target reading content. The requirement recognition result may be an entity, a phrase, or one or more sentences. The extended reading resource is a resource that is highly similar to the requirement recognition result, and may be a picture, a document, an audio, a video, or the like. In a specific embodiment, the present embodiment pre-establishes a corresponding relationship between the requirement recognition result and the extended reading resource, and displays an extended reading resource prompt box at the page position that matches the target reading content to prompt the user to expand reading resources.

Step 130, displaying the extended reading resource, in response to a viewing request matching the reading prompt.

In this step, when the user wants to view the above extended reading resource, he/she may click the extended reading resource prompt box, or hover above the extended reading resource prompt box. In the present embodiment, when the above user operation behavior is detected, the extended reading resource corresponding to the target reading content may be displayed.

The present embodiment displays the target page viewed by the user, then displays the extended reading resource corresponding to the target reading content based on the requirement recognition result of the target reading content in the target page. The present embodiment provides the user with audios and videos as extended reading resources, which enriches the vividness of reading, expands the depth and breadth of reading, and improves the user's reading experience; and secondly, the method for determining an extended reading content in the present embodiment is completely automated, saving a lot of labor costs.

Second Embodiment

Figure 2:
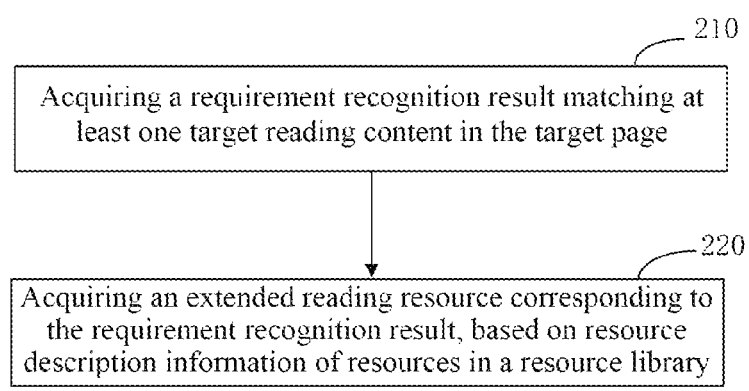
FIG. 2 is a schematic diagram according to a second embodiment of the present disclosure.

On the basis of the first embodiment, the present embodiment provides a specific implementation method for acquiring the extended reading resource corresponding to the requirement recognition result. The terms and explanations that are the same as or corresponding to those in the foregoing embodiment will be omitted in the present embodiment. FIG. 2 is a flowchart of a method for determining an extended reading content provided in the second embodiment of the present disclosure. The method specifically includes the following steps.

Step 210, acquiring a requirement recognition result matching at least one target reading content in the target page.

In the present embodiment, to acquire the requirement recognition result that matches the at least one target reading content in the target page, it may use a matching requirement method based on the data form (for example, text or picture) of the target reading content to acquire the requirement recognition result matching the target reading content. For example, if the target reading content is a text, the matching requirement recognition result may be acquired through text intent recognition. If the target reading content is a picture, the matching requirement recognition result may be acquired through image recognition. If the target reading content is a video, a key frame or subtitle information may be extracted first, and the matching requirement recognition result may be further determined based on the text intention recognition or image recognition, which is not limited in the present embodiment.

In a specific example, in order to meet cognitive requirements of the user continuously generated during browsing in an electronic reading scenario, the present embodiment may use the user's current browsing page as the target page. In a specific embodiment, based on all the text content included in the target page, the present embodiment digs out a potential text that requires extended reading of the user through text comprehension technology, such as a specific entity, phrase, sentence, or paragraph, as the target reading content, and then a pre-trained recognition model, such as an entity requirement recognition model or a phrase requirement recognition model may be used to recognize the above entity, phrase, sentence, or paragraph, to then acquire the requirement recognition result of the target page.

In another specific embodiment, after opening the above target page, the user may manually select a text that requires extended reading in the target page, such as a specific paragraph, sentence, phrase, or word as the target reading content. The present embodiment uses a pre-trained recognition model, such as an entity requirement recognition model or a phrase requirement recognition model to recognize the above paragraph, sentence, phrase, or word, to then acquire the requirement recognition result of the target page.

Step 220, acquiring an extended reading resource corresponding to the requirement recognition result, based on resource description information of resources in a resource library.

In this step, the present embodiment pre-establishes a resource library including various resources, and the resource includes: video resource and/or audio resource. The resource description information may include resource tag, resource content summary information, resource quality, and resource content detail information, etc. In a specific embodiment, the present embodiment uses video comprehension technology to acquire the extended reading resource corresponding to the above requirement recognition result, which is a specific video, and the resource tag may be classification information of the video; the resource content summary information may be specific behavior information involved in the video or summary information of video playback content, such as concert information; resource quality may be parameter information such as picture quality and clarity of the video; and resource content detail information may be specific lines and dialogue information, or the like included in the video.

In the present embodiment, the requirement recognition result acquired in the above step is compared with the resource description information in the resource library, to screen out a resource having high similarity to the requirement recognition result as the extended reading resource.

When a given requirement recognition result corresponds to a plurality of extended reading resources, in order to avoid unnecessary interference to the user caused by excessive extended reading resources, the present embodiment sorts and screens the extended reading resources according to a preset sorting and screening algorithm. Specifically, assuming that the extended reading resources are a plurality of videos, the present embodiment may select a set number of high-quality videos (for example, 2 or 3) by comparing parameter information such as video image quality, definition, and hits, as the extended reading resource that best matches the requirement recognition result.

In the present embodiment, after acquiring the extended reading resources corresponding to all the requirement recognition results included in the target page, reading content corresponding to each of the extended reading resources is determined in the target page; and if a given target reading content corresponds to at least two extended reading resources, the at least two extended reading resources are aggregated to obtain a resource aggregation result corresponding to the target reading content.

Specifically, assuming that there is a target reading content in the target page that corresponds to two extended reading resources of a video and a picture at the same time, then the two extended reading resources are aggregated to obtain the resource aggregation result, and this resource aggregation result is used as a final extended reading resource corresponding to the above target reading content.

The present embodiment acquires the requirement recognition result matching the target reading content in the target page; then, acquires the extended reading resource corresponding to the requirement recognition result based on the resource description information of the resources in the resource library. The present embodiment provides the user with high-quality videos and audios as extended reading resources, which enriches the vividness of reading, expands the depth and breadth of reading, and improves the user's reading experience; and secondly, the method for determining an extended reading content in the present embodiment is completely automated, saving a lot of labor costs.

Third Embodiment

Figure 3:
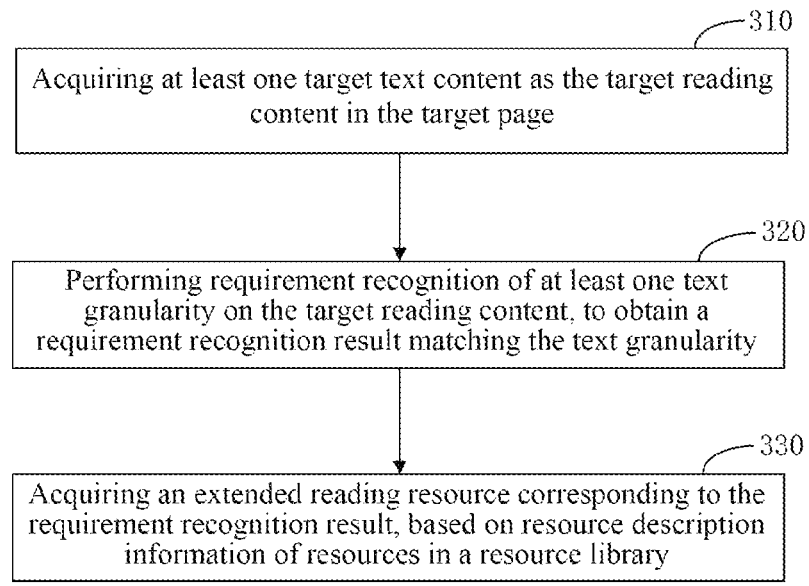
FIG. 3 is a schematic diagram according to a third embodiment of the present disclosure.

On the basis of the above embodiments, the present embodiment provides a specific implementation method for acquiring a requirement recognition result that matches at least one target reading content in the target page. The terms and explanations that are the same as or corresponding to those in the foregoing embodiments will be omitted in the present embodiment. FIG. 3 is a flowchart of a method for determining an extended reading content provided in the present third embodiment. The method specifically includes the following steps.

Step 310, acquiring at least one target text content as the target reading content in the target page.

In this step, the present embodiment may use the user's current browsing page as the target page. In a specific embodiment, based on all text content included in the target page, the present embodiment digs out a potential text that requires extended reading of the user through text comprehension technology, such as a specific entity, phrase, sentence, or paragraph, as the target reading content.

In another specific embodiment, after opening the above target page, the user may manually select a text that requires extended reading in the target page, such as a specific paragraph, sentence, phrase, or word as the target reading content.

Step 320, performing requirement recognition of at least one text granularity on the target reading content, to obtain a requirement recognition result matching the text granularity.

In the present embodiment, the text granularity may include an entity, a phrase, a sentence, and a paragraph.

In a specific embodiment, assuming that the target reading content is an entity or a phrase, the present embodiment may perform proper noun recognition or phrase recognition on the target reading content to obtain an entity or phrase corresponding to the target reading content and reflecting key information in the target reading content, then input the above content into a search engine to acquire a search result page, and use big data to acquire the knowledge point (entity or phrase) corresponding to one most clicked page selected by the user for the search result page as the requirement recognition result corresponding to the target reading content.

In another specific example, assuming that the target reading content is a sentence or a paragraph, the present embodiment may directly input the target reading content into a search engine to acquire a search result page, and use big data to acquire page description information corresponding to the one most clicked page selected by the user for the search result page as the requirement recognition result corresponding to the target reading content.

In another specific example, assuming that the target reading content is a paragraph, the present embodiment may split the paragraph into a plurality of sentences, rank the plurality of sentences according to a set algorithm, and use the first-ranked sentence as the requirement recognition result corresponding to the paragraph. Alternatively, the paragraph may be semantically compressed, to obtain a semantic vector corresponding to each compressed sentence, then a semantic recall result of each semantic vector is acquired. A plurality of semantic recall results are ranked, and the first-ranked semantic recall result is used as the requirement recognition result of the paragraph.

In another specific embodiment, the present embodiment may use a pre-trained recognition model to perform requirement recognition on each entity, phrase, and sentence, to obtain the corresponding requirement recognition result. The specific method steps are as follows.

Step 301, acquiring requirement recognition models corresponding to text granularities, respectively.

In this step, the present embodiment pre-trains the requirement recognition models corresponding to respective text granularities, including: entity requirement recognition model, phrase requirement recognition model, sentence requirement recognition model, and paragraph requirement recognition model.

Step 302, inputting the target reading content into a matching requirement recognition model according to a recognition unit matching the requirement recognition model, to obtain the requirement recognition result matching the corresponding text granularity.

In a specific embodiment, in the present embodiment, the target reading content is input into the entity requirement recognition model using entity as the recognition unit, and a corresponding entity requirement recognition result may be obtained; the target reading content is input into the phrase requirement recognition model using phrase as the recognition unit, and a corresponding phrase requirement recognition result may be obtained; the target reading content is input into the sentence requirement recognition model using sentence as the recognition unit, and a corresponding sentence requirement recognition result may be obtained; and the target reading content is input into the paragraph requirement recognition model using paragraph as the recognition unit, and a paragraph requirement recognition result may be obtained.

In a specific embodiment, when the text granularity is an entity, after obtaining a requirement recognition result matching the entity, the present embodiment may input the requirement recognition result of the entity into an entity extension requirement concept library, to obtain an entity upper requirement extension result and add the entity upper requirement extension result into the requirement recognition result of the entity; and/or input the requirement recognition result of the entity into an entity hotspot requirement concept library, to obtain an entity hotspot requirement extension result and add the entity hotspot requirement extension result into the requirement recognition result of the entity.

In this step, the entity extension requirement concept library and the entity hotspot requirement concept library are knowledge bases pre-established for extending entity content in the present embodiment.

Specifically, assuming that the entity requirement recognition result obtained by using the entity requirement recognition model is "Yangshao culture", and this entity requirement recognition result is input into the entity extension requirement concept library, an entity upper requirement extension result may be obtained as "Chinese Neolithic culture", and add this entity upper requirement extension result to the entity requirement recognition result to form a new entity requirement recognition result; assuming that the entity requirement recognition result obtained by using the entity requirement recognition model is "Houmuwu cauldron", and this entity requirement recognition result is input into the entity hotspot requirement concept library, an entity hotspot requirement extension result may be obtained as "the origin of the name Houmuwu cauldron", and add this entity hotspot requirement extension result to the entity requirement recognition result to form a new entity requirement recognition result.

In another specific embodiment, when the text granularity is an entity, after obtaining a requirement recognition result matching the entity, the present embodiment may also search for the requirement recognition result of the entity in a pre-established knowledge graph or structured knowledge base to obtain the entity upper requirement extension result, an entity lower requirement extension result, and an entity co-location requirement extension result, and add them to the requirement recognition result of the entity.

Specifically, assuming that the entity requirement recognition result obtained by using the entity requirement recognition model is "Yangshao culture", and this entity requirement recognition result is searched in the pre-established knowledge graph or structured knowledge base, may obtain an entity upper requirement extension result as "Chinese Neolithic culture", an entity lower requirement extension result as "types of painted pottery", and an entity co-location requirement extension result as "Cishan culture", and the entity upper requirement extension result, the entity lower requirement extension result, and the entity co-location requirement extension result are added to the requirement recognition result of the entity.

When the text granularity is a phrase, after obtaining a requirement recognition result matching the phrase, the present embodiment may input the requirement recognition result of the phrase into a phrase extension requirement concept library, to obtain a phrase requirement extension result and add into the requirement recognition result of the phrase.

In this step, the phrase extension requirement concept library is a knowledge base pre-established for extending phrase content in the present embodiment.

Specifically, assuming that the phrase requirement recognition result obtained by using the phrase requirement recognition model is "civil servant application conditions", and this phrase requirement recognition result is input into the phrase extension requirement concept library, a phrase requirement extension result may be obtained as "civil servant application content", and add this phrase requirement extension result to the phrase requirement recognition result to form a new phrase requirement recognition result.

Step 330, acquiring an extended reading resource corresponding to the requirement recognition result, based on resource description information of resources in a resource library.

The present embodiment performs requirement recognition of at least one text granularity on the target reading content, to obtain the requirement recognition result matching the text granularity; and then acquires the extended reading resource corresponding to the requirement recognition result, based on the resource description information of the resources in the resource library. In the present embodiment, by introducing the entity extension requirement concept library, the entity hotspot requirement concept library, and the phrase extension requirement concept library, it meets the multi-dimensional potential extension requirements of the user during text reading, and provides the user with high-quality documents, pictures and videos as extended reading resources, which enriches the vividness of reading, extends the depth and breadth of reading, and improves the user's reading experience; and secondly, the method for determining an extended reading content in the present embodiment is completely automated, saving a lot of labor costs.

Fourth Embodiment

Figure 4:
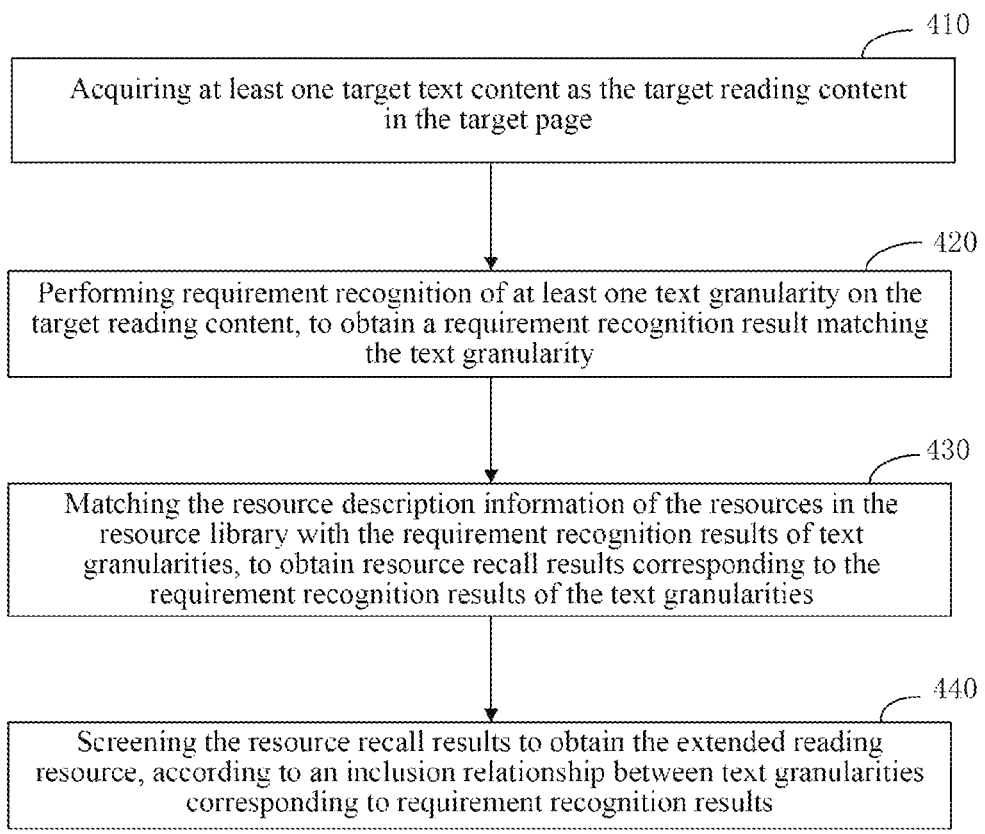
FIG. 4 is a schematic diagram according to a fourth embodiment of the present disclosure.

On the basis of the above embodiments, the present embodiment provides a specific implementation method for acquiring an extended reading resource corresponding to the requirement recognition result. The terms and explanations that are the same as or corresponding to those in the foregoing embodiments will be omitted in the present embodiment. FIG. 4 is a flowchart of a method for determining an extended reading content provided in the present fourth embodiment. The method specifically includes the following steps.

Step 410, acquiring at least one target text content as the target reading content in the target page.

Step 420, performing requirement recognition of at least one text granularity on the target reading content, to obtain a requirement recognition result matching the text granularity.

Step 430, matching the resource description information of the resources in the resource library with the requirement recognition results of respective text granularities, to obtain resource recall results respectively corresponding to the requirement recognition results of the respective text granularities.

In this step, the present embodiment pre-establishes a resource library including various resources, and the resource may be picture, document, audio, video, or the like. The resource description information may include resource tag, resource content summary information, resource quality, resource content detail information, or the like. In the present embodiment, the requirement recognition results of the respective text granularities (entity requirement recognition result, phrase requirement recognition result, sentence requirement recognition result, and paragraph requirement recognition result) acquired in the above step are matched with the resource description information of the resources in the resource library, to obtain the resource recall results respectively corresponding to the requirement recognition results of the respective text granularities.

Here, when the text granularity is an entity, the requirement recognition result of the entity is matched with resource tags of the resources in the resource library to obtain a resource recall result corresponding to the requirement recognition result of the entity.

Specifically, assuming that the requirement recognition result of the entity is "entertainment news", the resource tag may be video classification information in the resource library. The requirement recognition result of the entity is matched with the resource tags of the resources in the resource library, to acquire video resources having the resource tag "entertainment" as the resource recall result corresponding to the requirement recognition result of the entity.

In the present embodiment, before matching the resource description information of the resources in the resource library with the requirement recognition result of the entity, it further includes: filtering a general requirement entity included in the requirement recognition result of the entity. Here, the general requirement entity may be a common vocabulary in the text content, such as "event", "message", "clothing" and "article", an entity having a relatively large scope and including a plurality of levels of detailed categories. For the above entity, the scope of the acquired requirement recognition result of is too large and cannot accurately hit the user's real requirements. Therefore, the general requirement entity may be directly filtered.

When the text granularity is a phrase, matching resource description information of the resources in the resource library with a requirement recognition result of the phrase, to obtain a resource recall result corresponding to the requirement recognition result of the phrase, includes the following.

S401, matching a resource tag of an associated resource set in the resource library with the requirement recognition result of the phrase to obtain a first resource recall result.

S402, matching resource tags of the resources in the resource library with the requirement recognition result of the phrase to obtain the resource recall result corresponding to the requirement recognition result of the phrase, if the first resource recall result is empty.

S403, generating the resource recall result corresponding to the requirement recognition result of the phrase, based on the first resource recall result, if the first resource recall result is not empty.

Specifically, assuming that the requirement recognition result of the phrase is "Andy Lau Concert at Hung Hom Gymnasium, the present embodiment may use Andy Lau's concert video in the resource library as the associated resource set, and the resource tag may include information such as the time and location of the concert. The resource tag of the associated resource set is matched with the requirement recognition result of the phrase to obtain the first resource recall result; if the first resource recall result is empty, that is, there is no video resource of Andy Lau Concert at Hung Hom Gymnasium in the resource library, then the resource tags (such as picture tags or document tags) of the resources in the resource library are matched with the above requirement recognition result of the phrase, and obtain a picture or document corresponding to the requirement recognition result of the phrase as the resource recall result; and if the first resource recall result is not empty, that is, there is a video resource of Andy Lau Concert at Hung Hom Gymnasium in the resource library, then the resource recall result corresponding to the requirement recognition result of the phrase is generated based on this video resource.

When the text granularity is a sentence, matching the resource description information of the resources in the resource library with a requirement recognition result of the sentence, to obtain a resource recall result corresponding to the requirement recognition result of the sentence, includes the following.

S404, matching resource focuses of the resources in the resource library with the requirement recognition result of the sentence to obtain a second resource recall result.

S405, performing key entity recognition in the requirement recognition result of the sentence, and matching resource tags of the resources in the resource library with the key entity recognition result to obtain the resource recall result corresponding to the requirement recognition result of the sentence, if the second resource recall result is empty;

Step 406, generating the resource recall result corresponding to the requirement recognition result of the sentence, based on the second resource recall result, if the second resource recall result is not empty. Specifically, the resource focus may be specific behavior information involved in the resources in the resource library. Assuming that the requirement recognition result of the sentence is "Andy Lau holds a concert in Hung Hom stadium", the resource focus that matches the recognition result may be "Andy Lau holds a concert." The present embodiment matches the resource focuses of the resources in the resource library with the requirement recognition result of the sentence to obtain the second resource recall result; if the second resource recall result is empty, that is, there are no various resources such as pictures, documents, and videos of Andy Lau holds a concert in the resource library, and a plurality of key entities are recognized in the requirement recognition result of the above sentence, for example, Andy Lau, Hung Hom Stadium, and concert, then the resource tags of the resources in the resource library are matched with the plurality of key entity recognition results respectively to obtain the resource recall result corresponding to the requirement recognition result of the sentence; and if the second resource recall result is not empty, that is, there are various resources such as pictures, documents, or videos of Andy Lau holds a concert in the resource library, then the resource recall result corresponding to the requirement recognition result of the sentence is generated based on the picture, document or video.

When the text granularity is a paragraph, in the present embodiment, the resource content summary information and resource content detail information of the resources in the resource library are matched with a requirement recognition result of the paragraph, to obtain a resource recall result corresponding to the requirement recognition result of the paragraph.

In the present embodiment, the resource focus may be specific behavior information involved in the resources in the resource library, and the resource content detail information may be specific lines, dialogues, and subtitle information, etc. included in the resources. Specifically, assuming that the requirement recognition result of the paragraph is news content of Andy Lau holds a concert, the present embodiment may match the specific behavior information, lines, dialogues, and subtitle information involved in the resources in the resource library with the above requirement recognition result of the paragraph, and use the acquired documents, pictures or videos related to Andy Lau holds a concert as the resource recall result corresponding to the requirement recognition result of the paragraph.

Step 440, screening the resource recall results to obtain the extended reading resource, according to an inclusion relationship between text granularities corresponding to requirement recognition results.

In the present embodiment, assuming that a certain text granularity corresponds to the resource recall results of a plurality of text granularities at the same time, for example, a certain paragraph corresponds to the resource recall result of the paragraph, the resource recall result of the sentence in the paragraph, and the resource recall result of the phrase in the paragraph at the same time, in the present embodiment, it is necessary to screen the plurality of resource recall results to obtain the extended reading resource that best matches the target reading content. The specific screening method includes the following steps.

S407, acquiring sequentially a target requirement recognition result of a target text granularity in ascending order of the text granularity.

S408, determining whether there is a requirement recognition result of another text granularity higher than the target text granularity in a target text content matching the target requirement recognition result.

S409, if yes, deleting a resource recall result corresponding to the target requirement recognition result; otherwise, using the resource recall result corresponding to the target requirement recognition result as an extended reading resource.

S410, performing back the acquiring sequentially a target requirement recognition result of a target text granularity in ascending order of the text granularity, until processing of all requirement recognition results is completed.

In the present embodiment, assuming that the target reading content is a specific paragraph, in ascending order of the text granularity, first, the entity in the paragraph is used as the target text granularity, and the entity requirement recognition result acquired through the above steps is used as the target requirement recognition result; then, it is determined whether there is the requirement recognition result of another text granularity higher than the entity in the target text content, such as the phrase requirement recognition result, the sentence requirement recognition result or the paragraph requirement recognition result; if there is the phrase requirement recognition result, the resource recall result corresponding to the entity requirement recognition result is deleted, and the phrase requirement recognition result is used as the target requirement recognition result, and continue to perform the above steps; and if not, the resource recall result corresponding to the above entity requirement recognition result is used as the extended reading resource that best matches the target reading content.

The reason for this setting is that the larger the text granularity, the richer and more specific the information included in the corresponding requirement recognition result, the greater the probability that it hits the user's actual extended reading requirements. Therefore, if a given target text content corresponds to the requirement recognition results of a plurality of text granularities, only the requirement recognition result of the maximum text granularity may be kept to avoid interference to the user when recommending a large number of extended reading content.

The present embodiment performs requirement recognition of at least one text granularity on the target reading content, to obtain the requirement recognition result matching the text granularity, then matches the resource description information of the resources in the resource library with the requirement recognition results of text granularities, to obtain the resource recall results respectively corresponding to the requirement recognition results of the text granularities, and finally screens the resource recall results to obtain the extended reading resource, according to the inclusion relationship between the text granularities corresponding to the requirement recognition results. In the present embodiment, the resource recall result that best matches the potential extension requirements of the user during reading is acquired, which enriches the vividness of reading, expends the depth and breadth of reading, and improves the user's reading experience; and secondly, the method for determining an extended reading content in the present embodiment is completely automated, saving a lot of labor costs.

Fifth Embodiment

Figure 5:
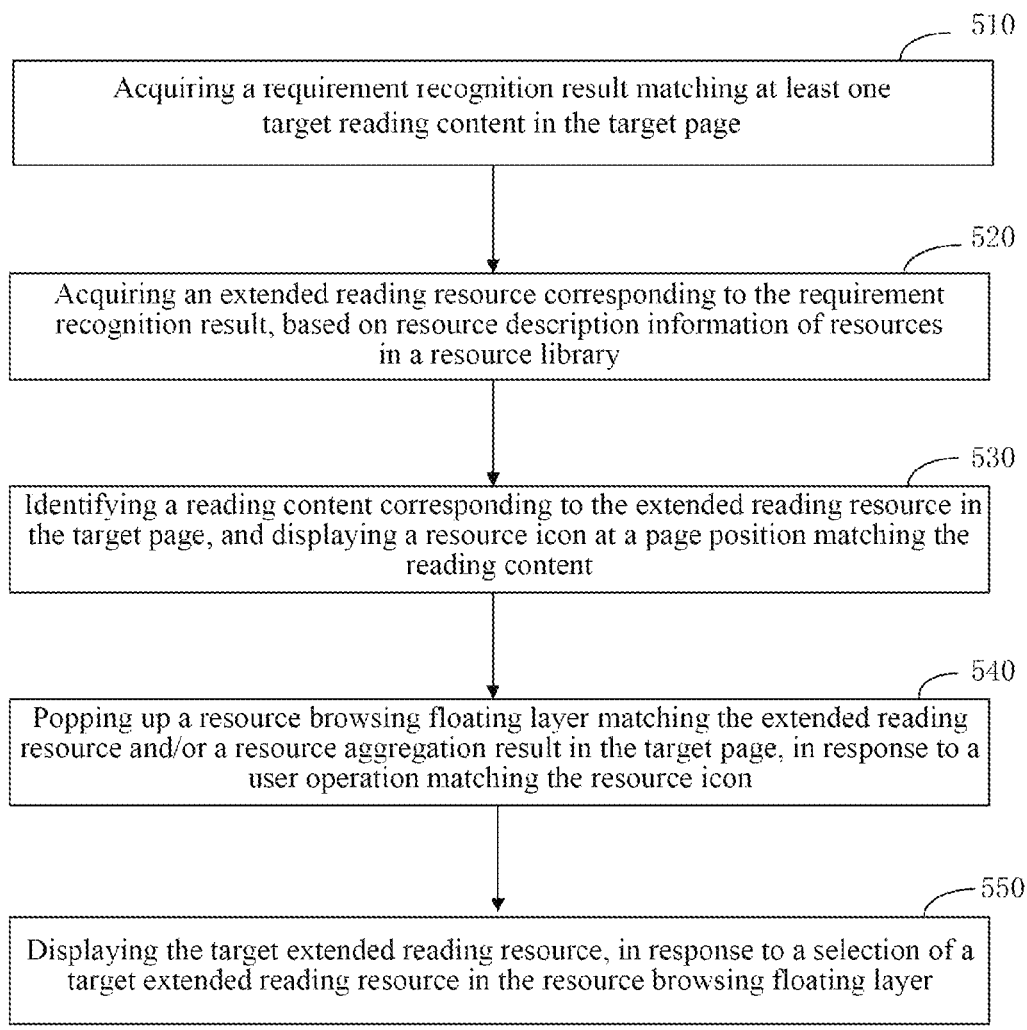
FIG. 5 is a schematic diagram according to a fifth embodiment of the present disclosure.

On the basis of the above embodiments, the present embodiment provides a specific implementation method for displaying an extended reading resource. The terms and explanations that are the same as or corresponding to those in the foregoing embodiments will be omitted in the present embodiment. FIG. 5 is a flowchart of a method for determining an extended reading content provided in the fifth embodiment of the present disclosure. The method specifically includes the following steps.

Step 510, acquiring a requirement recognition result matching at least one target reading content in the target page.

In this step, the target page is the currently displayed page in a client, and the target reading content is all page content in the currently displayed page, or a page content selected by the user in the currently displayed page.

In a specific embodiment, the present embodiment may use a pre-trained recognition model such as an entity requirement recognition model, a phrase requirement recognition model, a sentence requirement recognition model, or a paragraph requirement recognition model based on all text content included in the display page, to recognize all the above text content, and obtain the requirement recognition result. In another specific embodiment, after opening the above target page, the user may manually select a text that requires extended reading in the target page as the target reading content. The present embodiment may use a pre-trained recognition model, such as an entity requirement recognition model, a phrase requirement recognition model, a sentence requirement recognition model, or a paragraph requirement recognition model to recognize the above target reading content and obtain the requirement recognition result.

Step 520, acquiring an extended reading resource corresponding to the requirement recognition result, based on resource description information of resources in a resource library.

Step 530, identifying a reading content corresponding to the extended reading resource in the target page, and displaying a resource icon at a page position matching the reading content to give the reading prompt to the extended reading resource.

In a specific embodiment, in the present embodiment, the reading content corresponding to the extended reading resource may be identified in the target page by underlining or changing the font color, and without affecting the user's reading, a matching resource icon, such as a video icon, a document icon, or a picture icon, may be displayed at the page position such as the upper right or upper left corner of the reading content.

Step 540, popping up a resource browsing floating layer matching the extended reading resource and/or a resource aggregation result in the target page, in response to a user operation matching the resource icon.

In this step, when the user wants to view the above extended reading resource, he/she may click the resource icon, or hover above the resource icon. In the present embodiment, when the above user operation behavior is detected, the extended reading resource corresponding to the reading content may be directly popped up in the target page, or the resource browsing floating layer matching the extended reading resource may be popped up; when a given target reading content in the target page corresponds to a plurality of extended reading resources, such as pictures resources, video resources, or document resources, the present embodiment may pop up the resource aggregation result of the plurality of extended reading resources to the target page in the form of the resource browsing floating layer.

Step 550, displaying the target extended reading resource, in response to a selection of a target extended reading resource in the resource browsing floating layer.

In this step, when the user wants to view a specific extended reading resource in the resource browsing floating layer, he/she may select a to-be-displayed resource in the resource browsing floating layer as the target extended reading resource. In the present embodiment, when a triggering operation of the user on the target extended reading resource is detected, the target extended reading resource is displayed. Here, the present embodiment may directly display the target extended reading resource on the currently displayed page, or jump to the display page for display.

The present embodiment acquires the requirement recognition result that matches the target reading content in the target page, then acquires the extended reading resource corresponding to the requirement recognition result, based on the resource description information of the resources in the resource library, and finally identifies the reading content corresponding to the extended reading resource in the target page, and displays the resource icon at the page position matching the reading content, for the user to view the extended reading resource. The present embodiment provides the user with high-quality documents, pictures and videos as extended reading resources, which enriches the vividness of reading, expands the depth and breadth of reading, and improves the user's reading experience; and secondly, the method for determining an extended reading content in the present embodiment is completely automated, saving a lot of labor costs.

Sixth Embodiment

Figure 6:
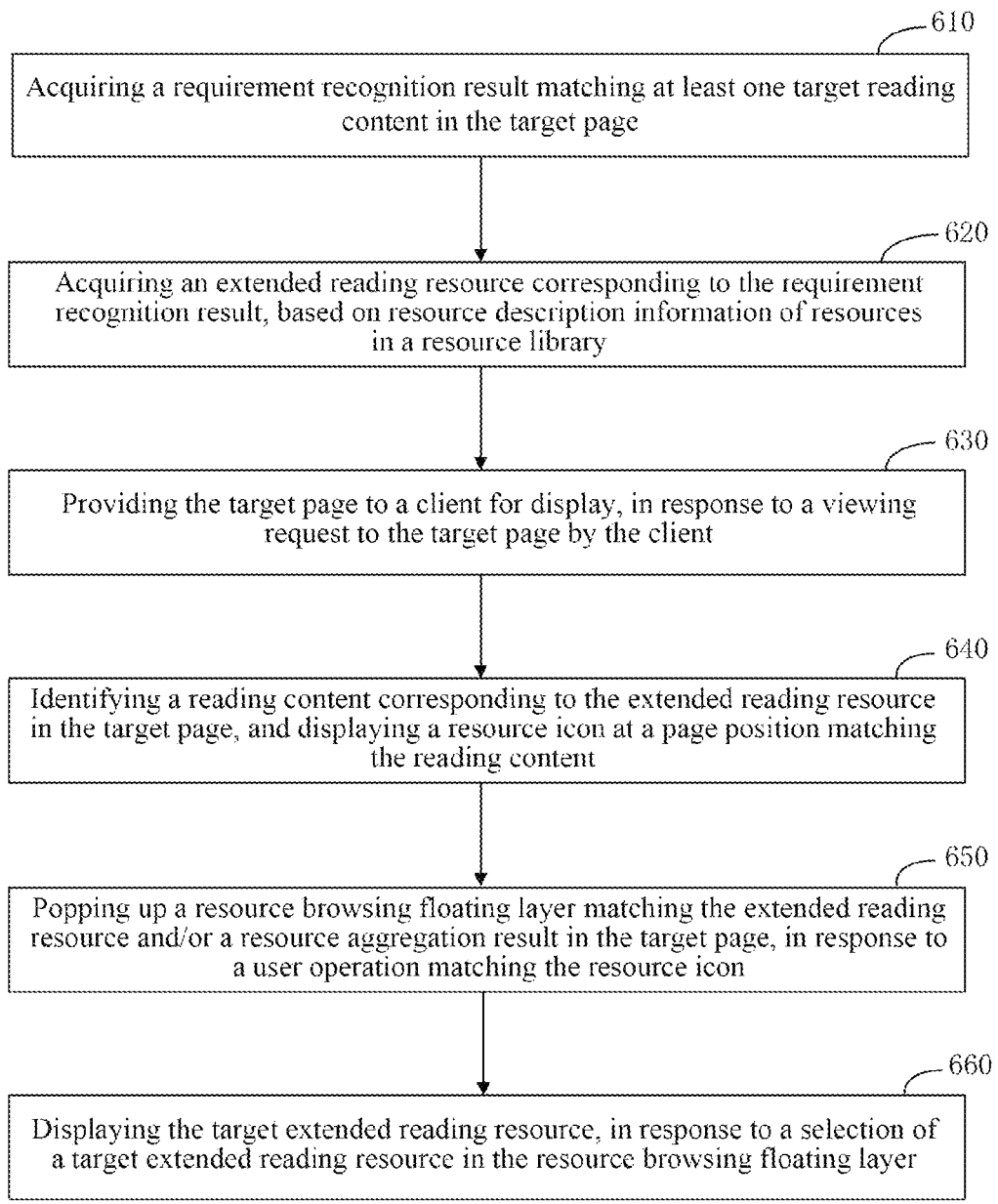
FIG. 6 is a schematic diagram according to a sixth embodiment of the present disclosure.

On the basis of the above embodiments, the present embodiment provides a specific implementation method for displaying an extended reading resource. The terms and explanations that are the same as or corresponding to those in the foregoing embodiments will be omitted in the present embodiment. FIG. 6 is a flowchart of a method for determining an extended reading content provided in the sixth embodiment of the present disclosure. The method specifically includes the following steps.

Step 610, acquiring a requirement recognition result matching at least one target reading content in the target page.

In this step, the target page is an indexed page of the search engine, and the target reading content is all page content in the indexed page. In a specific embodiment, when a certain page is indexed by the search engine, based on all the page content in the indexed page, a pre-trained recognition model, such as an entity requirement recognition model, a phrase requirement recognition model, a sentence requirement recognition model, or a paragraph requirement recognition model may be used to recognize all the above page content to obtain the requirement recognition result.

Step 620, acquiring an extended reading resource corresponding to the requirement recognition result, based on resource description information of resources in a resource library.

Step 630, providing the target page to a client for display, in response to a viewing request to the target page by the client.

In this step, when the user triggers a viewing request of a certain page in a list of indexed pages of the search engine in the client, the present embodiment uses the page as the target page and provides the target page to the client for display.

Step 640, identifying a reading content corresponding to the extended reading resource in the target page, and displaying a resource icon at a page position that matches the reading content.

In a specific embodiment, in the present embodiment, the reading content corresponding to the extended reading resource may be identified in the target page by underlining or changing the font color, and without affecting the user's reading, a matching resource icon, such as a video icon, a document icon, or a picture icon, may be displayed at the page position such as the upper right or upper left corner of the target reading content.

Step 650, popping up a resource browsing floating layer matching the extended reading resource and/or a resource aggregation result in the target page, in response to a user operation matching the resource icon.

In a specific embodiment, when the user wants to view the above extended reading resource, he/she may click the resource icon, or hover above the resource icon. In the present embodiment, when the above user operation behavior is detected, the extended reading resource corresponding to the target reading content may be directly popped up in the target page, or the resource browsing floating layer matching the extended reading resource may be popped up; when a given target reading content in the target page corresponds to a plurality of extended reading resources, such as a plurality of video resources, the present embodiment may pop up the resource aggregation result of the plurality of video resources (i.e., video set) to the target page in the form of the resource browsing floating layer.

Step 660, displaying the target extended reading resource, in response to a selection of a target extended reading resource in the resource browsing floating layer.

In this step, when the user wants to view a specific extended reading resource in the resource browsing floating layer, he/she may select a to-be-displayed resource in the resource browsing floating layer as the target extended reading resource. In the present embodiment, when a triggering operation of the user on the target extended reading resource is detected, the target extended reading resource is displayed. Here, the present embodiment may directly display the target extended reading resource on the currently displayed page, or jump to the display page for display.

The present embodiment first acquires the requirement recognition result that matches the target reading content in the indexed page of the search engine, then acquires the extended reading resource corresponding to the requirement recognition result, based on the resource description information of the resources in the resource library, and finally identifies the reading content corresponding to the extended reading resource in the indexed page, and displays the resource icon at the page position that matches the reading content, for the user to view the extended reading resource. The present embodiment provides the user with high-quality documents, pictures and videos as extended reading resources, which enriches the vividness of reading, expands the depth and breadth of reading, and improves the user's reading experience; and secondly, the method for determining an extended reading content in the present embodiment is completely automated, saving a lot of labor costs.

Seventh Embodiment

Figure 7:
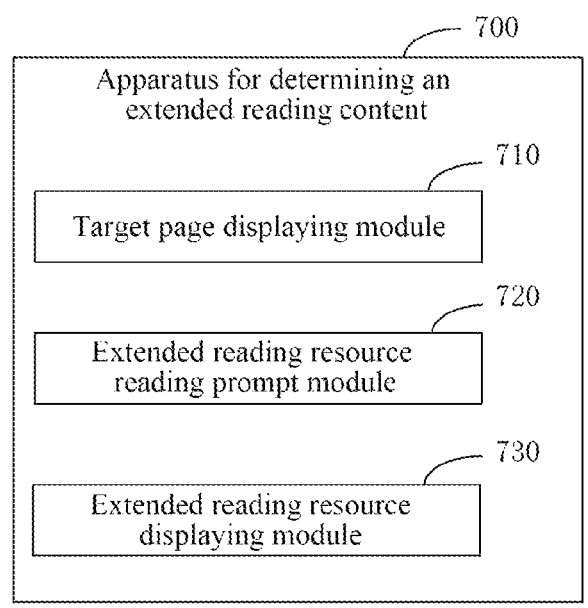
FIG. 7 is a schematic diagram according to a seventh embodiment of the present disclosure.

FIG. 7 is a structural diagram of an apparatus 700 for determining an extended reading content provided by the present seventh embodiment. The apparatus includes: a target page displaying module 710, an extended reading resource reading prompt module 720 and an extended reading resource displaying module 730. The target page displaying module 710 is configured to display a target page, in response to a viewing request to the target page. The extended reading resource reading prompt module 720 is configured to give a reading prompt to an extended reading resource in the target page, based on a corresponding relationship between a requirement recognition result of at least one target reading content in the target page and the extended reading resource. The extended reading resource displaying module 730 is configured to display the extended reading resource, in response to the viewing request matching the reading prompt.

The present embodiment displays the target page viewed by the user, then displays the extended reading resource corresponding to the target reading content based on the requirement recognition result of the target reading content in the target page. The present embodiment provides the user with audios and videos as extended reading resources, which enriches the vividness of reading, expends the depth and breadth of reading, and improves the user's reading experience; and secondly, the method for determining an extended reading content in the present embodiment is completely automated, saving a lot of labor costs.

On the basis of the above embodiments, the extended reading resource reading prompt module 720 may include: a requirement recognition result acquisition unit, configured to acquire a requirement recognition result matching at least one target reading content in the target page; and an extended reading resource acquisition unit, configured to acquire an extended reading resource corresponding to the requirement recognition result, based on resource description information of resources in a resource library; where the resource includes at least one of: video resource or audio resource; a target reading content determining unit, configured to acquire at least one target text content as the target reading content in the target page; a requirement recognition result determining unit, configured to perform requirement recognition of at least one text granularity on the target reading content, to obtain a requirement recognition result matching the text granularity; a requirement recognition model acquisition unit, configured to acquire requirement recognition models corresponding to text granularities, respectively; a target reading content input unit, configured to input the target reading content into a matching requirement recognition model according to a recognition unit matching the requirement recognition model, to obtain the requirement recognition result matching a corresponding text granularity; an entity upper requirement extension result acquisition unit, configured to input the requirement recognition result of the entity into an entity extension requirement concept library, to obtain an entity upper requirement extension result and add the entity upper requirement extension result into the requirement recognition result of the entity; an entity hotspot requirement extension result acquisition unit, configured to input the requirement recognition result of the entity into an entity hotspot requirement concept library, to obtain an entity hotspot requirement extension result and add the entity hotspot requirement extension result into the requirement recognition result of the entity; a phrase requirement extension result acquisition unit, configured to input the requirement recognition result of the phrase into a phrase extension requirement concept library, to obtain a phrase requirement extension result and add the phrase requirement extension result into the requirement recognition result of the phrase; a resource recall result acquisition unit, configured to match the resource description information of the resources in the resource library with the requirement recognition results of the text granularities, to obtain resource recall results corresponding to the requirement recognition result of the text granularities; a resource recall result screening unit, configured to screen the resource recall results to obtain the extended reading resource, according to an inclusion relationship between text granularities corresponding to requirement recognition results; an entity requirement recognition result matching unit, configured to match the requirement recognition result of the entity with resource tags of the resources in the resource library to obtain the resource recall result corresponding to the requirement recognition result of the entity; a general requirement entity filtering unit, configured to filter a general requirement entity included in the requirement recognition result of the entity; a first resource recall result acquisition unit, configured to match a resource tag of an associated resource set in the resource library with the requirement recognition result of the phrase to obtain a first resource recall result; a phrase requirement recognition result matching unit, configured to match resource tags of the resources in the resource library with the requirement recognition result of the phrase to obtain the resource recall result corresponding to the requirement recognition result of the phrase, if the first resource recall result is empty; a phrase corresponding resource recall result generation unit, configured to generate the resource recall result corresponding to the requirement recognition result of the phrase, based on the first resource recall result, if the first resource recall result is not empty; a second resource recall result acquisition unit, configured to match resource content summary information of the resources in the resource library with the requirement recognition result of the sentence to obtain a second resource recall result; a key entity recognition unit, configured to perform key entity recognition in the requirement recognition result of the sentence, and match resource tags of the resources in the resource library with the key entity recognition result to obtain the resource recall result corresponding to the requirement recognition result of the sentence, if the second resource recall result is empty; a sentence corresponding resource recall result generation unit, configured to generate the resource recall result corresponding to the requirement recognition result of the sentence, based on the second resource recall result, if the second resource recall result is not empty; a paragraph requirement recognition result matching unit, configured to match resource content summary information and resource content detail information of the resources in the resource library with the requirement recognition result of the paragraph to obtain the resource recall result corresponding to the requirement recognition result of the paragraph; a target requirement recognition result acquisition unit, configured to acquire sequentially a target requirement recognition result of a target text granularity in ascending order of the text granularity; a determination unit, configured to determine whether there is a requirement recognition result of another text granularity higher than the target text granularity in a target text content matching the target requirement recognition result, if yes, delete a resource recall result corresponding to the target requirement recognition result; otherwise, use the resource recall result corresponding to the target requirement recognition result as an extended reading resource; an all requirement recognition results processing unit, configured to perform back the acquiring sequentially a target requirement recognition result of a target text granularity in ascending order of the text granularity, until processing of all requirement recognition results is completed; an extended reading resource screening unit, configured to sort and screen the extended reading resource according to a preset sorting and screening algorithm; a reading content determining unit, configured to determine a reading content corresponding to each of the extended reading resource in the target page; an extended reading resource aggregation unit, configured to aggregate at least two extended reading resources to obtain a resource aggregation result corresponding to the target reading content, in response to that a given target reading content corresponds to at least two extended reading resources; a page content acquisition unit, configured to acquire all page content in the target page, or use a page content selected by a user in the target page, as the target reading content; a resource icon displaying unit, configured to identify a reading content corresponding to the extended reading resource in the target page, and display a resource icon at a page position that matches the reading content to give the reading prompt to the extended reading resource; a resource browsing floating layer popping unit, configured to pop up a resource browsing floating layer matching the extended reading resource and/or a resource aggregation result in the target page, in response to a user operation matching the resource icon; and a target extended reading resource responding unit, configured to display the target extended reading resource, in response to a selection of a target extended reading resource in the resource browsing floating layer.

The target page displaying module 710 may include: a search engine indexed page acquisition unit, configured to acquire all page content in the target page as the target reading content, when the target page is acquired as a search engine indexed page.

The apparatus for determining an extended reading content provided by the present embodiment may perform the method for determining an extended reading content provided by any embodiment of the present disclosure, and has the corresponding functional modules and beneficial effects for performing the method.

Eighth Embodiment

Figure 8:
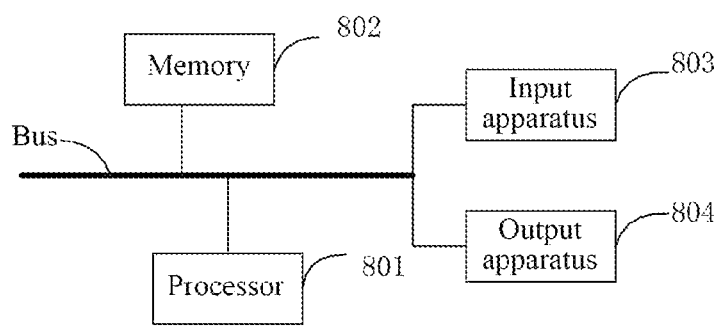
FIG. 8 is a block diagram of an electronic device for implementing the method for determining an extended reading content according to embodiments of the present disclosure.

According to an embodiment of the present disclosure, the present disclosure also provides an electronic device and a readable storage medium. As shown in FIG. 8, is a block diagram of an electronic device of the method for determining an extended reading content according to the embodiments of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 8, the electronic device includes: one or more processors 801, a memory 802, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a group of blade servers, or a multi-processor system). In FIG. 8, one processor 801 is used as an example. The memory 802 is a non-transitory computer readable storage medium provided by the present disclosure. The memory stores instructions executable by at least one processor, so that the at least one processor performs the method for determining an extended reading content provided by the present disclosure. The non-transitory computer readable storage medium of the present disclosure stores computer instructions for causing a computer to perform the method for determining an extended reading content provided by the present disclosure.

The memory 802, as a non-transitory computer readable storage medium, may be used to store non-transitory software programs, non-transitory computer executable programs and modules, such as program instructions/modules corresponding to the method for determining an extended reading content in the embodiments of the present disclosure (for example, the target page displaying module 710, the extended reading resource reading prompt module 720 and the extended reading resource displaying module 730 shown in FIG. 7). The processor 801 executes the non-transitory software programs, instructions, and modules stored in the memory 802 to execute various functional applications and data processing of the server, that is, to implement the method for determining an extended reading content in the foregoing method embodiments. The memory 802 may include a program storage area and a data storage area. The program storage area may store an operating system and an application program required by at least one function; and the data storage area may store data, etc. created by the use of the electronic device of the method for determining an extended reading content. In addition, the memory 802 may include a high-speed random access memory, and may also include a non-transitory memory, such as at least one magnetic disk storage device, a flash memory device, or other non-transitory solid-state storage devices. In some embodiments, the memory 802 may alternatively include a memory remotely provided with respect to the processor 801, and these remote memories may be connected to the electronic device of the method for determining an extended reading content through a network. Examples of the network include but are not limited to the Internet, intranet, local area network, mobile communication network, and combinations thereof.

The electronic device of the method for determining an extended reading content may also include: an input apparatus 803 and an output apparatus 804. The processor 801, the memory 802, the input apparatus 803, and the output apparatus 804 may be connected through a bus or in other methods. In FIG. 8, connection through a bus is used as an example. The input apparatus 803 may receive input digital or character information, and generate key signal inputs related to user settings and function control of the electronic device of the method for determining an extended reading content, such as touch screen, keypad, mouse, trackpad, touchpad, pointing stick, one or more mouse buttons, trackball, joystick and other input apparatuses. The output apparatus 804 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor. In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user. The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), and the Internet. The computer system may include a client and a server. The client and the server are generally far from each other and usually interact through the communication network. The relationship between the client and the server is generated by computer programs that run on the corresponding computer and have a client-server relationship with each other.

According to the technical solution of the embodiments of the present disclosure, high-quality documents, pictures and videos are provided to the user as extended reading resources, which enriches the vividness of reading, expands the depth and breadth of reading, and improves the user's reading experience; and secondly, the method for determining an extended reading content in the embodiments of the present disclosure is completely automated, saving a lot of labor costs.

It should be understood that the various forms of processes shown above may be used to re-sort, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for determining an extended reading content, comprising:
    displaying a target page, in response to a viewing request to the target page;
    acquiring at least one target text content as target reading content in the target page;
    performing requirement recognition of text granularities on the target reading content, to obtain requirement recognition results matching the text granularities;

matching resource description information of resources in a resource library with the requirement recognition results of the text granularities, to obtain resource recall results corresponding to the requirement recognition results of the text granularities;

screening the resource recall results to obtain an extended reading resource, according to an inclusion relationship between the text granularities corresponding to requirement recognition results;

giving a reading prompt to the extended reading resource in the target page; and displaying the extended reading resource, in response to the viewing request matching the reading prompt.

2. The method according to claim 1, wherein the performing requirement recognition of at least one text granularity on the target reading content, to obtain the requirement recognition result matching the text granularity, comprises:

acquiring requirement recognition models corresponding to text granularities, respectively; and inputting the target reading content into a matching requirement recognition model according to a recognition unit matching the requirement recognition model, to obtain the requirement recognition result matching a corresponding text granularity.

3. The method according to claim 1, wherein the text granularity comprises: an entity; and after obtaining the requirement recognition result matching the entity, the method further comprises:

inputting the requirement recognition result of the entity into an entity extension requirement concept library, to obtain an entity upper requirement extension result and add the entity upper requirement extension result into the requirement recognition result of the entity; and/or inputting the requirement recognition result of the entity into an entity hotspot requirement concept library, to obtain an entity hotspot requirement extension result and add the entity hotspot requirement extension result into the requirement recognition result of the entity.

4. The method according to claim 1, wherein the text granularity comprises: a phrase; and after obtaining the requirement recognition result matching the phrase, the method further comprises:

inputting the requirement recognition result of the phrase into a phrase extension requirement concept library, to obtain a phrase requirement extension result and add the phrase requirement extension result into the requirement recognition result of the phrase.

5. The method according to claim 1, wherein the text granularity comprises: an entity;

matching the resource description information of the resources in the resource library with a requirement recognition result of the entity, to obtain a resource recall result corresponding to the requirement recognition result of the entity, comprises:

matching the requirement recognition result of the entity with resource tags of the resources in the resource library to obtain the resource recall result corresponding to the requirement recognition result of the entity.

6. The method according to claim 5, wherein, before matching the resource description information of the resources in the resource library with the requirement recognition result of the entity, the method further comprises:

filtering a general requirement entity included in the requirement recognition result of the entity.

7. The method according to claim 1, wherein the text granularity comprises: a phrase;

matching the resource description information of the resources in the resource library with a requirement recognition result of the phrase, to obtain a resource recall result corresponding to the requirement recognition result of the phrase, comprises:

matching a resource tag of an associated resource set in the resource library with the requirement recognition result of the phrase to obtain a first resource recall result;

matching resource tags of the resources in the resource library with the requirement recognition result of the phrase to obtain the resource recall result corresponding to the requirement recognition result of the phrase, in response to the first resource recall result being empty; and generating the resource recall result corresponding to the requirement recognition result of the phrase, based on the first resource recall result, in response to the first resource recall result being not empty.

8. The method according to claim 1, wherein the text granularity comprises: a sentence;

matching the resource description information of the resources in the resource library with a requirement recognition result of the sentence, to obtain a resource recall result corresponding to the requirement recognition result of the sentence, comprises:

matching resource focuses of the resources in the resource library with the requirement recognition result of the sentence to obtain a second resource recall result;

performing key entity recognition in the requirement recognition result of the sentence, and matching resource tags of the resources in the resource library with a key entity recognition result to obtain the resource recall result corresponding to the requirement recognition result of the sentence, in response to the second resource recall result being empty; and generating the resource recall result corresponding to the requirement recognition result of the sentence, based on the second resource recall result, in response to the second resource recall result being not empty.

9. The method according to claim 1, wherein the text granularity comprises: a paragraph;

matching the resource description information of the resources in the resource library with a requirement recognition result of the paragraph, to obtain a resource recall result corresponding to the requirement recognition result of the paragraph, comprises:

matching resource content summary information and resource content detail information of the resources in the resource library with the requirement recognition result of the paragraph to obtain the resource recall result corresponding to the requirement recognition result of the paragraph.

10. The method according to claim 1, wherein the screening the resource recall results to obtain the extended reading resource, according to an inclusion relationship between the text granularities corresponding to requirement recognition results, comprises:

acquiring sequentially a target requirement recognition result of a target text granularity in ascending order of the text granularity;

determining whether there is a requirement recognition result of another text granularity higher than the target text granularity in a target text content matching the target requirement recognition result;

if yes, deleting a resource recall result corresponding to the target requirement recognition result; otherwise, using the resource recall result corresponding to the target requirement recognition result as an extended reading resource; and performing back the acquiring sequentially a target requirement recognition result of a target text granularity in ascending order of the text granularity, until processing of all requirement recognition results is completed.

11. The method according to claim 1, wherein, after acquiring the extended reading resource corresponding to the requirement recognition result, based on resource description information of resources in the resource library, the method further comprises:

sorting and screening the extended reading resource according to a preset sorting and screening algorithm.

12. The method according to claim 1, wherein, after acquiring the extended reading resource corresponding to the requirement recognition result, based on resource description information of resources in the resource library, the method further comprises:

determining a reading content corresponding to each of the extended reading resource in the target page; and aggregating at least two extended reading resources to obtain a resource aggregation result corresponding to the target reading content, in response to that a given target reading content corresponds to at least two extended reading resources.

13. The method according to claim 1, wherein, after displaying the target page, in response to a viewing request to a target page, the method further comprises:

acquiring all page content in the target page, or using a page content selected by a user in the target page, as the target reading content.

14. The method according to claim 1, wherein, before displaying the target page, in response to a viewing request to a target page, the method further comprises:

acquiring all page content in the target page as the target reading content, when the target page is acquired as a search engine indexed page.

15. The method according to claim 1, wherein, the giving the reading prompt to the extended reading resource in the target page, comprises:

identifying a reading content corresponding to the extended reading resource in the target page, and displaying a resource icon at a page position matching the reading content to give the reading prompt to the extended reading resource.

16. The method according to claim 15, wherein, the displaying the extended reading resource, in response to the viewing request matching the reading prompt, comprises:

popping up a resource browsing floating layer matching the extended reading resource and/or a resource aggregation result in the target page, in response to a user operation matching the resource icon; and displaying the target extended reading resource, in response to a selection of a target extended reading resource in the resource browsing floating layer.

17. An electronic device, comprising:

at least one processor; and a memory, communicatively connected to the at least one processor; wherein, the memory, storing instructions executable by the at least one processor, the instructions, when executed by the at least one processor, cause the at least one processor to perform operations, the operations comprising:

displaying a target page, in response to a viewing request to the target page;

acquiring at least one target text content as target reading content in the target page;

performing requirement recognition of text granularities on the target reading content, to obtain requirement recognition results matching the text granularities;

matching resource description information of resources in a resource library with the requirement recognition results of the text granularities, to obtain resource recall results corresponding to the requirement recognition results of the text granularities;

screening the resource recall results to obtain an extended reading resource, according to an inclusion relationship between the text granularities corresponding to requirement recognition results;

giving a reading prompt to the extended reading resource in the target page; and displaying the extended reading resource, in response to the viewing request matching the reading prompt.

* * * * *